Jan. 29, 1963　　　　　C. LORENZ　　　　　3,075,233
FARM WAGON CASTER WHEEL
Filed July 20, 1960　　　　　　　　　　　2 Sheets-Sheet 1
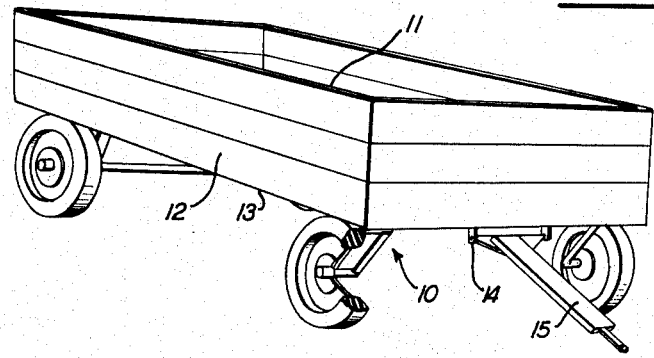
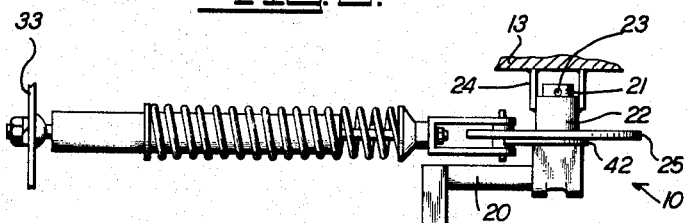
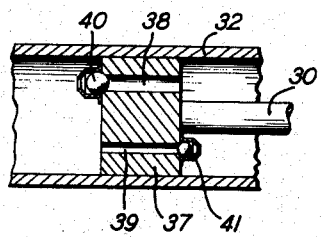
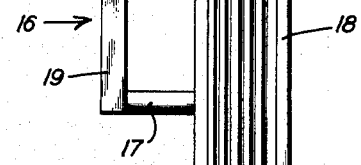
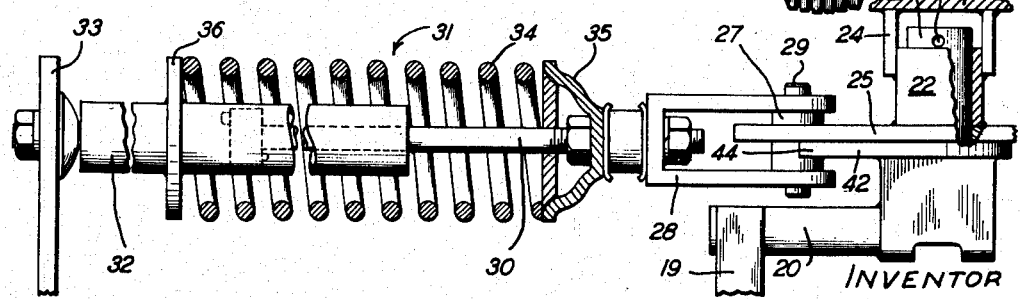
INVENTOR
CLYDE LORENZ
BY
*Lowell & Henderson*
ATTORNEYS Jan. 29, 1963 C. LORENZ 3,075,233
FARM WAGON CASTER WHEEL
Filed July 20, 1960 2 Sheets-Sheet 2
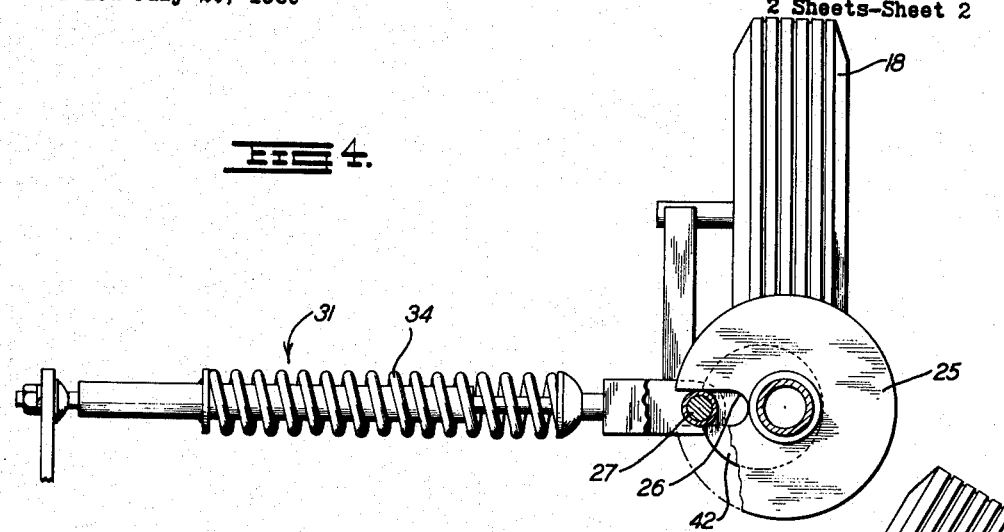
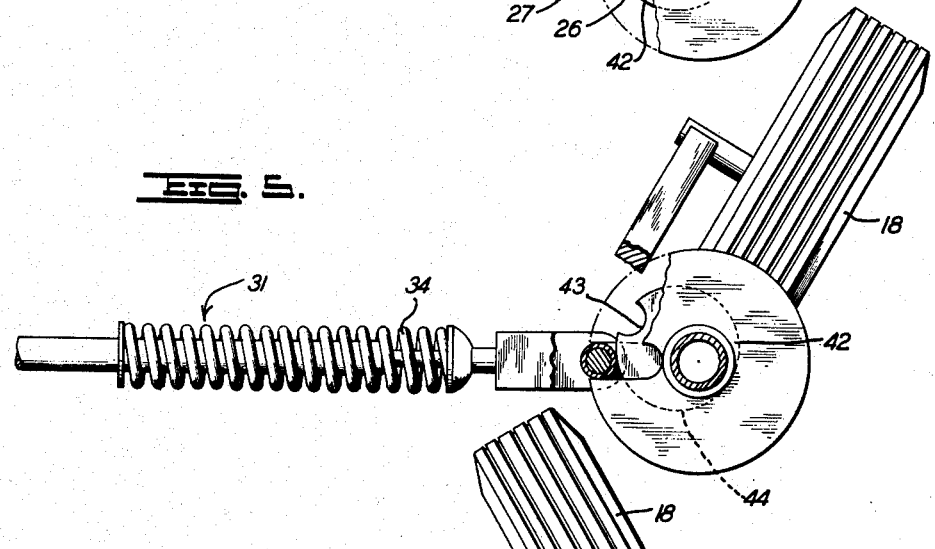
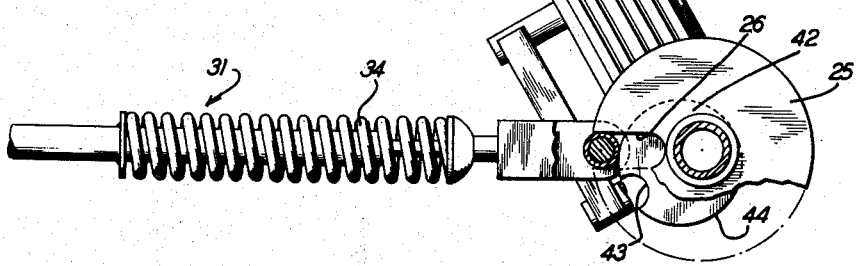
INVENTOR
CLYDE LORENZ
BY *Lowell & Henderson*
ATTORNEYS

United States Patent Office 3,075,233
Patented Jan. 29, 1963

3,075,233
FARM WAGON CASTER WHEEL
Clyde Lorenz, 12910 W. 92nd St., Lenexa, Kans.
Filed July 20, 1960, Ser. No. 44,160
5 Claims. (Cl. 16—35)

This invention relates to vehicle front wheel suspensions generally and more particularly to an improved caster wheel for farm wagons or the like.

Modern day farming vehicles must be adaptable for use over terrain of widely varying types. Where a drawn farm vehicle utilizing a front caster wheel suspension is used over rough terrain, numerous problems have arisen, for when the caster wheels encounter ruts in the road or small objects, they tend to whip out of normal position and cause an undesirable shimmy action.

In the past attempts have been made to stabilize caster wheels of agricultural implements by utilizing a recessed cam surface and a spring biased cam follower. However, in these previous stabilizing devices, a constant pressure has been exerted on the cam follower unit, and these devices have proved to be insufficient to check the shimmying action of the caster wheels upon contact with small or irregular objects.

It is the primary object of this invention to provide an improved caster wheel for agricultural vehicles which will remain stabilized when the wheel is drawn over rough terrain.

It is another object of this invention to provide a caster wheel for agricultural vehicles which utilizes a notched cam surface and a spring biased cam follower in conjunction with a dashpot to stabilize the caster wheel.

It is a further object of this invention to provide an improved caster wheel for agricultural vehicles in which a variable bias is applied to a cam follower which co-acts with a notched cam surface to stabilize the caster wheels.

It is a still further object of this invention to provide an improved caster wheel for agricultural vehicles having a stabilizing unit which provides pressure to aid in the turning of the caster wheel and which opposes the return of the caster wheel to the normal position.

With the foregoing and other objects in view, the invention resides in the following specification and appended claims, certain details of construction of which are illustrated in the accompanying drawings in which:

FIGURE 1 is a perspective view showing the caster wheel of the present invention mounted upon a farm wagon;

FIGURE 2 is a view in front elevation of the caster wheel assembly of the present invention;

FIGURE 3 is a view in front elevation, to an enlarged scale, of a portion of the caster wheel assembly of FIGURE 2;

FIGURE 4 is a plan view of the caster wheel assembly of the present invention with the caster wheel in the normal operating position;

FIGURE 5 is a plan view of the caster wheel assembly of the present invention illustrating the caster wheel in a right turn position;

FIGURE 6 is a plan view of the caster wheel assembly of the present invention illustrating the caster wheel in a left turn position, and FIGURE 7 is a longitudinal section view taken centrally of the dashpot of FIGURE 3.

Referring now to the drawings, the caster wheel assembly of the present invention indicated generally at 10 is shown mounted upon a farm wagon 11. Farm wagon 11 includes four upright sides 12 and a flat bottom 13. Secured to the underside of the wagon bottom 13 at the front of the wagon is a tongue supporting frame 14 which pivotally supports a wagon tongue 15. Wagon tongue 15 is capable of pivotal movement in only a vertical direction, and is restrained from horizontal movement by the tongue supporting frame 14.

The caster wheel assembly 10 of the present invention consists of an integral or substantially one piece wheel suspension member 16 as shown by FIGURE 2. Suspension member 16 includes an axle 17 upon which is mounted a wheel 18, a vertical upright 19, and an extension member 20 which extends at right angles to the vertical upright 19 and supports a bearing rod 21. Bearing rod 21 extends upwardly through a sleeve 22 and acts as an internal bearing member within the sleeve. The rod 21 may be secured within the sleeve by inserting a pin through a hole 23 provided in the upper portion of the rod, or any other suitable securing means may be utilized. Sleeve 22 is secured to the bottom 13 of the wagon 11 by means of two downwardly directed flange or strap members 24 which are welded to the upper portion of sleeve 22 and hooked to the bottom of the wagon. Integrally secured to the bottom of the sleeve 22 is a guide cam plate 25 having a notch 26 provided therein as shown by FIGURES 4 and 6. This guide plate is maintained rigid with the bottom 13 of the wagon 11 by the sleeve 22 and the straps 24, and during normal straight line movement of the wagon, a cooperative roller member 27 rests within the notch 26 of the guide plate 25. Roller 27 may be formed from rubber or other suitable material, and is rotatably mounted on a clevis 28 by means of a pin 29. Clevis 28 is secured to one end of a piston shaft 30 of a dashpot 31.

Dashpot 31 includes a hydraulic cylinder 32 which is secured to the wagon 11 by means of a bracket 33, and a coil spring 34 which is held in place about the cylinder 32 by means of a retaining member 35 attached to the piston shaft 30, and a retaining member 36 secured to the cylinder 32. Attached to the end of the piston shaft 30 within the hydraulic cylinder 32 is a piston 37 as shown by FIGURE 4. Extending through the piston 37 is an upper passage 38 and a lower passage 39 which permit the fluid within hydraulic cylinder 32 to flow through the piston 37 upon longitudinal movement of the piston shaft 30. Upper passage 38 is provided with a check valve 40 which permits fluid to flow through the upper passage when the piston shaft 30 is moved outwardly from the cylinder 32 and prohibits fluid from flowing through the upper passage 38 when the piston shaft 30 is moved into or toward the cylinder 32. Lower passage 39 is provided with a check valve 41 which permits fluid to flow through the lower passage when the piston shaft 30 is moved toward or into the cylinder 32, and prohibits fluid from flowing through the lower passage 39 when the piston shaft 30 is moved outwardly or away from the cylinder 32. Check valves 40 and 41 have been illustrated as valves of the ball type in FIGURE 4, but it is obvious that any suitable check valve may be utilized. The upper passage 38 through the piston 37 is of a greater diameter than the lower passage 39, so that more fluid is permitted to flow through the passage 38 and less resistance is offered by the piston 37 to the outward movement of the shaft 30, while less fluid is allowed to flow through passage 39 and the piston 37 offers greater resistance to the inward movement of the shaft 30.

An eccentric lower cam plate 42 having a peripheral cam surface 44 is rigidly mounted upon the right angle extension member 20 of the wheel suspension 16 so as to be positioned directly below the guide plate 25. Lower cam plate 42 is movable with the wheel suspension 16, and is provided with a notch 43 (FIGURES 5 and 6) which cooperates with the notch 26 in the guide plate 25 when the wheel 18 is in the straight line position. With the wagon wheel 18 in the straight line position, the notches 26 and 43 are in alignment, and the roller member 27 is seated in both the notches 26 and 43.

In the operation of the caster wheel assembly of the present invention, when the wagon wheel 18 is in the straight line position as shown by FIGURE 4, the notches 26 and 43 in the plates 25 and 42 are aligned to receive the roller 27. The coil spring 34 of the dashpot assembly 31 provides a biasing pressure against the roller 27 which tends to maintain it within the slots 43 and 26. When the roller 27 is maintained in the slots 26 and 43 by the action of the spring 34, the lower cam plate 42 is locked to the stationary guide plate 25 by the roller 27, and the wheel 18 is not permitted to move from the straight line position. Spring 34 keeps the roller 27 in the slots 26 and 43 when the wheel 18 encounters ruts and other smaller objects, so that the wheel 18 is not permitted to caster or shimmy.

When the wagon 11 is turned, sufficient pressure is exerted to overcome the bias of the spring 34 and disengage the roller 27 from the notch 43 in the lower cam plate 42. This will allow the wheel 18 to turn, as shown in FIGURES 5 and 6, and cause the roller 27 to ride down the peripheral cam surface 44 of the cam 42. As the wheel 18 is turned, the piston shaft 30 moves outwardly from the cylinder 32 and fluid flows rapidly through the large upper passage 38 in the piston 37. The piston 37 offers little resistance to the biasing effect of the spring 34 so that the spring exerts a greater pressure on the roller 27 causing it to move rapidly down the cam surface 44 and thus assist the friction of the wheel engaging the road in moving the wheel member 18 to agree with the degree of turn exerted on the wagon 11 by the wagon tongue 15.

After the turn has been completed and the wagon wheel 18 is being moved back to a straight line position, the roller member 27 will begin to ride back up the cam surface 44 of the lower cam plate 42 against the biasing action of the coil spring 34. Also the check valve 40 will close and the check valve 41 will open permitting fluid to flow through the small lower passage 39 of the piston 37. Due to the small diameter of the lower passage 39, the piston 37 will resist the inward movent of the piston shaft 30 and provide a snubbing action which will somewhat retard the return movement of the roller 27 along the surface 44 of the lower cam plate 42. The return movement of the roller 27 along the cam surface 44 is retarded to such an extent that the roller 27 is prevented from overshooting the notch 43 in the lower cam plate. Thus when the roller 27 reaches the notch 43, it reseats itself therein to maintain the wagon wheel 18 in a straight line position.

It will be readily apparent to those skilled in the art that the present invention provides a novel and improved caster wheel assembly for agricultural vehicles which will maintain the vehicle wheel in a stabilized position at all times. The arrangement and types of components utilized within this invention may be subject to numerous modifications well within the purview of this inventor who intends only to be limited to a liberal interpretation of the specification and appended claims.

I claim:

1. A caster wheel assembly for a vehicle comprising a wheel suspension member pivotally mounted on the underside of said vehicle, a wheel carried by the lower portion of said wheel suspension member, a cam plate secured to the upper portion of said wheel suspension member, a guide plate rigidly secured to the bottom of said vehicle above said cam plate, a spring biased dashpot assembly secured to the underside of said vehicle, and a roller member attached to said spring biased dashpot assembly, said roller member being maintained in constant contact with both said plates by said spring biased dashpot assembly to prevent the castering of said caster wheel assembly when the vehicle is moving in a straight line.

2. A caster wheel assembly for a vehicle comprising a wheel suspension member pivotally mounted on the underside of said vehicle, a wheel carried by the lower portion of said wheel suspension member, an eccentrically mounted cam plate secured to the upper portion of said wheel suspension member, said cam plate having a peripheral cam surface with a notch provided therein, a guide plate rigidly secured to the bottom of said vehicle above said cam plate, said guide plate being provided with a notch which is in alignment with the notch of said cam plate when the caster wheel assembly is in a straight line position, a spring biased dashpot assembly secured to the underside of said vehicle, and a roller member attached to said spring biased dashpot assembly, said roller member being maintained in constant contact with both said plates by said assembly and seated in the notches of said plates when the vehicle is moving in a straight line to prevent the castering of said caster wheel assembly, said roller member always seated in said guide plate notch at all relative positions of said plates.

3. A caster wheel assembly for a vehicle comprising a wheel suspension member pivotally mounted on the underside of said vehicle, a wheel carried by the lower portion of said wheel suspension member, a cam plate secured to the upper portion of said wheel suspension member, a guide plate rigidly secured to the bottom of said vehicle above said cam plate, and a dashpot assembly secured to the underside of said vehicle, said dashpot assembly including a hydraulic cylinder, a piston shaft operative within said hydraulic cylinder, a roller member attached to one end of said piston shaft, a spring operatively connected to said piston shaft for biasing same outwardly of said hydraulic cylinder and into continual engagement with both said plates at all relative positions thereof, and a piston secured to the opposite end of said piston shaft within said hydraulic cylinder, said piston including check valve means which permit, in combination with said spring, said piston shaft to be initially moved into said hydraulic cylinder and subsequently moved rapidly from said hydraulic cylinder when said caster wheel assembly is moved from a straight line to a turned position, said check valve means also combining with said spring to cause said piston shaft to first resist the movement of said caster wheel assembly from a turned to a straight line position and then to assist the movement of the caster wheel assembly toward the straight line position.

4. A caster wheel assembly for a vehicle comprising a wheel suspension member pivotally mounted on the underside of said vehicle, a wheel carried by the lower portion of said wheel suspension member, an eccentrically mounted cam plate secured to the upper portion of said wheel suspension member, said cam plate having a peripheral cam surface with a notch provided therein, a guide plate rigidly secured to the bottom of said vehicle above and in contacting relation with said cam plate, said guide plate being provided with a notch which is in alignment with the notch of said cam plate when the caster wheel assembly is in a straight line position, a dashpot assembly secured to the underside of said vehicle and extended in a direction normal to the rotative axis of said cam plate, said assembly including a spring biased piston and cylinder device wherein said piston movement outwardly of said cylinder is aided, and movement inwardly thereof is deterred and a roller member attached to said piston for continuous engagement with said plates at all positions thereof, said roller member seated in said notches of said plates when the caster wheel assembly is in a straight line position, said dashpot assembly being adapted to resist the initial movement of said roller member when the caster wheel assembly is moved out of a straight line position, to permit said roller member to move rapidly down the peripheral cam surface of said cam plate after the initial turning movement of the caster wheel assembly from a straight line position, and to first resist the movement of said roller member up the cam surface of said cam plate when the caster wheel assembly is moved from a turned position toward a straight line position and then to assist movement of the caster wheel assembly toward the straight line position.

5. A caster wheel assembly for a vehicle comprising a wheel suspension member pivotally mounted on the underside of said vehicle, a wheel carried by the lower portion of said wheel suspension member, and eccentrically mounted cam plate secured to the upper portion of said wheel suspension member, said cam plate having a peripheral cam surface with a notch provided therein, a guide plate rigidly secured to the bottom of said vehicle in juxtaposed relation with said cam plate, said guide plate being provided with a notch which is in alignment with the notch of said cam plate when the caster wheel assembly is in a straight line position, and biased means secured to the underside of said vehicle and extending in a direction substantially normal to the rotative axis of said cam plate, said biased means including a roller member having its axis substantially parallel to the rotative axis of said cam plate and means biasing said roller member in continuous engagement with said plates at all positions thereof, said roller member being seated in said notches of said plates when the caster wheel assembly is in a straight line position, said biased means being adapted to first resist the initial movement of said roller member when the caster wheel assembly is moved out of a straight line position and then to assist the subsequent movement of the roller member to aid the turning of the caster wheel assembly.

References Cited in the file of this patent

UNITED STATES PATENTS

| | | |
|---|---|---|
| 1,543,098 | Carter et al. | June 23, 1925 |
| 2,583,858 | Kostolecki | Jan. 29, 1952 |
| 2,588,792 | Barkley | Mar. 11, 1952 |
| 2,654,112 | Milhizer | Oct. 6, 1953 |